July 7, 1931.                P. H. BENEDIX                 1,813,526
                          FLUID PRESSURE MOTOR
                          Filed Jan. 14, 1927           7 Sheets-Sheet 1

Witness:
William P. Kilroy

Inventor:
Paul H. Benedix

July 7, 1931.　　　P. H. BENEDIX　　　1,813,526
FLUID PRESSURE MOTOR
Filed Jan. 14, 1927　　　7 Sheets-Sheet 2

Witness:
William P. Kilroy

Inventor:
Paul H. Benedix
By Hill & Hill
Attys

July 7, 1931.  P. H. BENEDIX  1,813,526
FLUID PRESSURE MOTOR
Filed Jan. 14, 1927   7 Sheets-Sheet 4

Witness:
William P. Kilroy

Inventor:
Paul H. Benedix

July 7, 1931.　　P. H. BENEDIX　　1,813,526
FLUID PRESSURE MOTOR
Filed Jan. 14, 1927　　7 Sheets-Sheet 5

Inventor
Paul H. Benedix

July 7, 1931.  P. H. BENEDIX  1,813,526
FLUID PRESSURE MOTOR
Filed Jan. 14, 1927   7 Sheets-Sheet 6
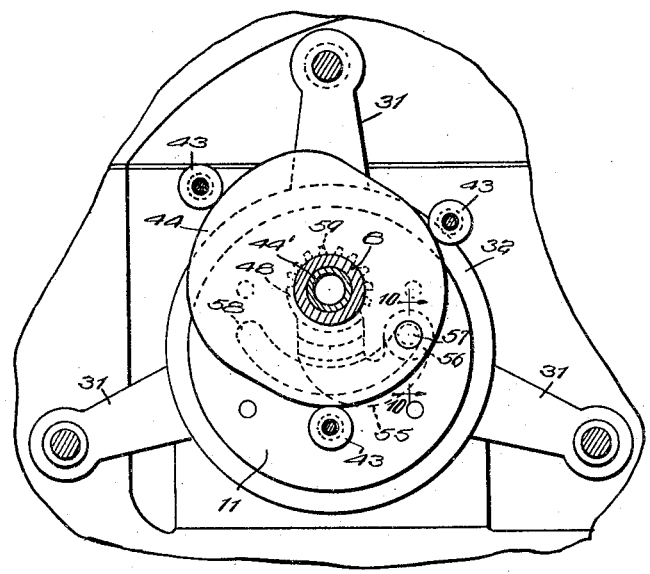
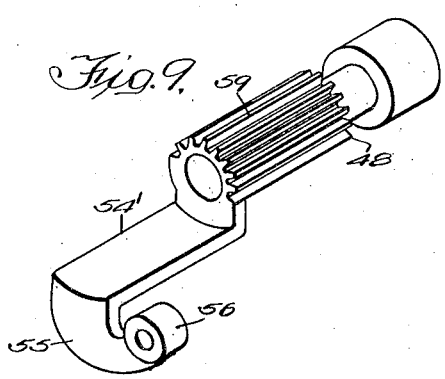
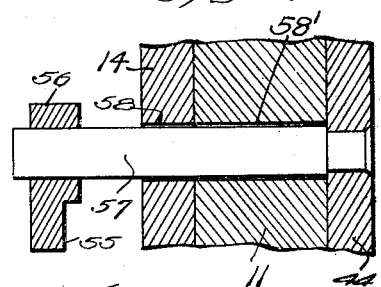
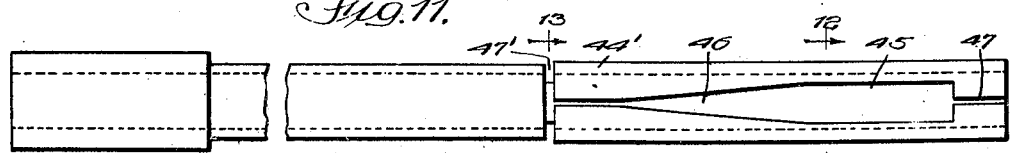
Witness:
William P. Kilroy
Inventor:
Paul H. Benedix
By Hill & Hill
Attys

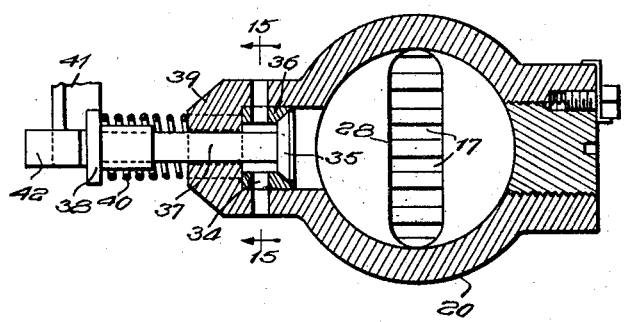

Patented July 7, 1931

1,813,526

UNITED STATES PATENT OFFICE

PAUL H. BENEDIX, OF CHICAGO, ILLINOIS

FLUID PRESSURE MOTOR

Application filed January 14, 1927. Serial No. 161,125.

This invention relates to fluid pressure motors of the type in which the rotary driving member is in the form of a plurality of rigidly connected angularly disposed cylinders connected to a central body member and rotatable as a unit about a center for imparting movement to a driven member which may be in the form of a shaft. These types of motors may be operated by steam, compressed air or other motor fluid and are useful for numerous purposes.

The main object of my invention is the provision of a fluid pressure motor of the above type wherein the simplicity of construction and operation provides for the maximum amount of driving power with a minimum amount of fluid pressure, and wherein the device is so constructed and arranged that it may be used equally well as an air compressor.

A further object of my invention is the provision of a fluid pressure motor wherein the parts are so constructed and arranged that the mechanism which covers the control of the fluid inlet and exhaust can be quickly and readily reversed so that the motor may be driven in either direction.

Another object of my invention is the provision of a fluid pressure motor equipped with a novel type of manually adjustable fluid inlet valve which can be readily adjusted to regulate the admittance of fluid to the cylinders of the motor so that after the motor has increased its speed to a certain number of revolutions, the valve may be readily adjusted for decreasing the admittance of fluid to the cylinders, whereby considerable saving in the fluid used in driving the motor is assured as the driving of the motor will rely considerably upon the expansion taking place during the rotation of the motor.

A further object of my invention is the provision of a fluid pressure motor of the above type wherein the cylinders are provided with double exhaust ports located adjacent the inner and outer ends thereof, respectively, so that all of the used fluid may be exhausted from the cylinders before a new charge of fluid under pressure is received in the cylinders and the inner exhaust ports used for draining any water from the cylinders which might accumulate therein when steam is used for fluid pressure.

A still further object of the invention is the provision of a fluid motor of the above type wherein the construction and arrangement of the parts is such as to provide a substantially fluid-tight motor of this type which tends to increase the capacity of the fluid used and guarantee a maximum driving power with the use of a minimum amount of fluid.

A still further object of the invention is the provision of a new and improved type of housing for gland packing wherein the retaining member, while readily adjustable, is securely and positively retained against adjustment during the operation of the motor.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts;

Fig. 8 is a transverse section on the line 8—8 of Fig. 2;

Fig. 9 is a detail perspective view of a portion of the reversing mechanism;

Fig. 10 is a detail section on the line 10—10 of Fig. 8;

Fig. 11 is a side elevation of the valve member which controls the inlet of the fluid;

Fig. 12 is a transverse section on the line 12—12 of Fig. 11;

Fig. 13 is a transverse section on the line 13—13 of Fig. 11;

Fig. 14 is a detail section on the line 14—14 of Fig. 3;

Fig. 15 is a detail section on the line 15—15 of Fig. 14;

Fig. 16 is a detail section on the line 16—16 of Fig. 3;

Fig. 17 is a detail section on line 17—17 of Fig. 3; and

Fig. 18 is a detail perspective view of one of the wedge bolts used in connecting the annulus to the outer ends of the cylinders.

Figure 1:
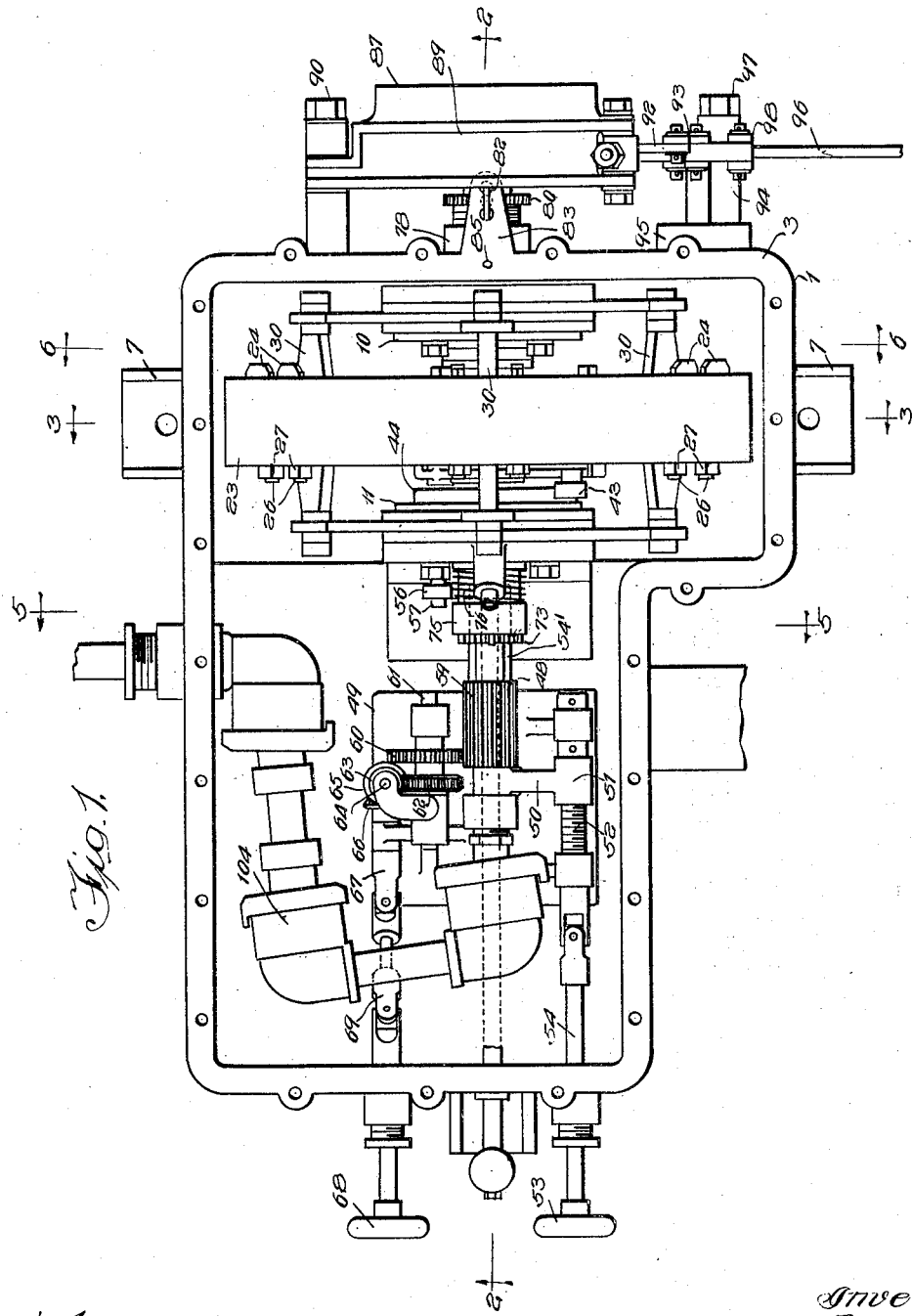
Fig. 1 is a top plan view of a motor constructed in accordance with my invention, the cover portion of the housing being removed.

In carrying out my invention, I prefer to enclose the operative parts of the motor in a suitable housing formed in a plurality of sections although at present I have shown two separable sections, namely, the lower or body section 1, and the upper or cover section 2, said sections being provided at their meeting edges with outwardly disposed perforated flanges 3 and 4 which are connected together by means of the bolts 5 and have provided therebetween the gasket 6 which provides a substantially fluid tight housing.

The housing may be supported upon any suitable type of base, and in order to connect the same to the base and prevent movement of the housing during operation of the motor the lower or body portion of the housing is formed with a plurality of laterally disposed perforated ears 7 through which lag screws, bolts or similar fastening members may be extended for connecting the housing to the base.

The driven member in the present instance comprises a hollow shaft 8 which extends longitudinally of the housing and is mounted in suitable bearings with the outer end thereof closed by means of the plug member 9. The main bearings in the present instance are in the form of eccentrics 10 and 11 and are arranged in opposed relation within the enlarged portion 12 of the housing. The eccentric bearing member 10 is bolted to one end of the main section of the housing 1 and is provided with a suitable bearing filler 13. The other eccentric member 11 is bolted to the vertical portion of the rigid angular portion 14 which is connected to the housing in any suitable manner. The eccentric 11 is also provided with a bearing filler 13 which may be formed of Babbitt or any other suitable material. The periphery of the shaft 8 is provided with an annular shoulder 15 and disposed between this shoulder and the eccentric bearing 10 is the thrust bearing 16.

Figure 2:
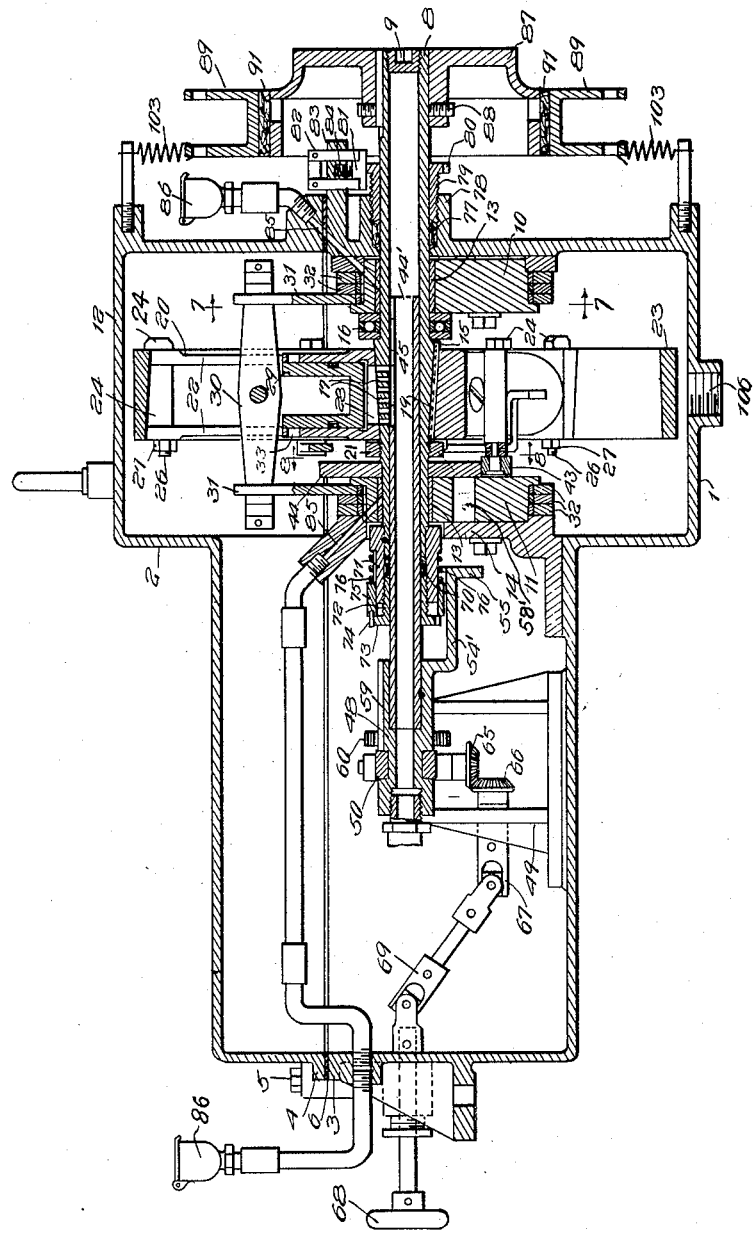
Fig. 2 is a longitudinal section on the line 2—2 of Fig. 1.

In Fig. 2 it will be noted that the shaft 8 is formed on a taper extending inwardly from the shoulder 15 and is provided at one side thereof with a plurality of parallel ports 17, and mounted upon this tapered portion is a cylinder-carrying body 18 which is keyed to the shaft as shown at 19. Extending radially from the cylinder carrying body 18 and arranged at various angular positions relative to each other are the cylinders 20, each cylinder having its inner end open and arranged to communicate with the ports 17 to receive a supply of fluid under pressure. The body 18 is retained in position upon the tapered portion of the shaft 8 by means of the nut 21 threaded upon the shaft and bearing against one side of the body as clearly illustrated in Fig. 2. The cylinders are preferably formed with oppositely disposed slotted portions 22 which extend from a predetermined point in the body of each cylinder to the outer end thereof and open through the outer end. The outer ends of the cylinders are preferably curved in a direction at right angles to the slotted portions 22 and tapered in a direction at right angles to the curved portion whereby an annulus 23 may be moved into position over the outer ends of the cylinders and retained in this position by means of the wedge bolts 24 which are passed through suitable receiving notches in the outer ends of the cylinders, the headed end of each bolt being formed with a perpendicular shoulder 25 adapted to engage one edge of the annulus 23 while the other end of the bolt is formed with a reduced threaded shank 26 adapted to receive thereon a securing nut 27. Thus it will be noted that in view of the fact that the annulus 23 is disposed over the outer ends of the cylinder on an incline and retained against movement longitudinally of the cylinders by means of the bolt 24, the outer ends of the cylinders will be securely connected and reduce to a minimum any lateral strain on the same.

Figure 3:
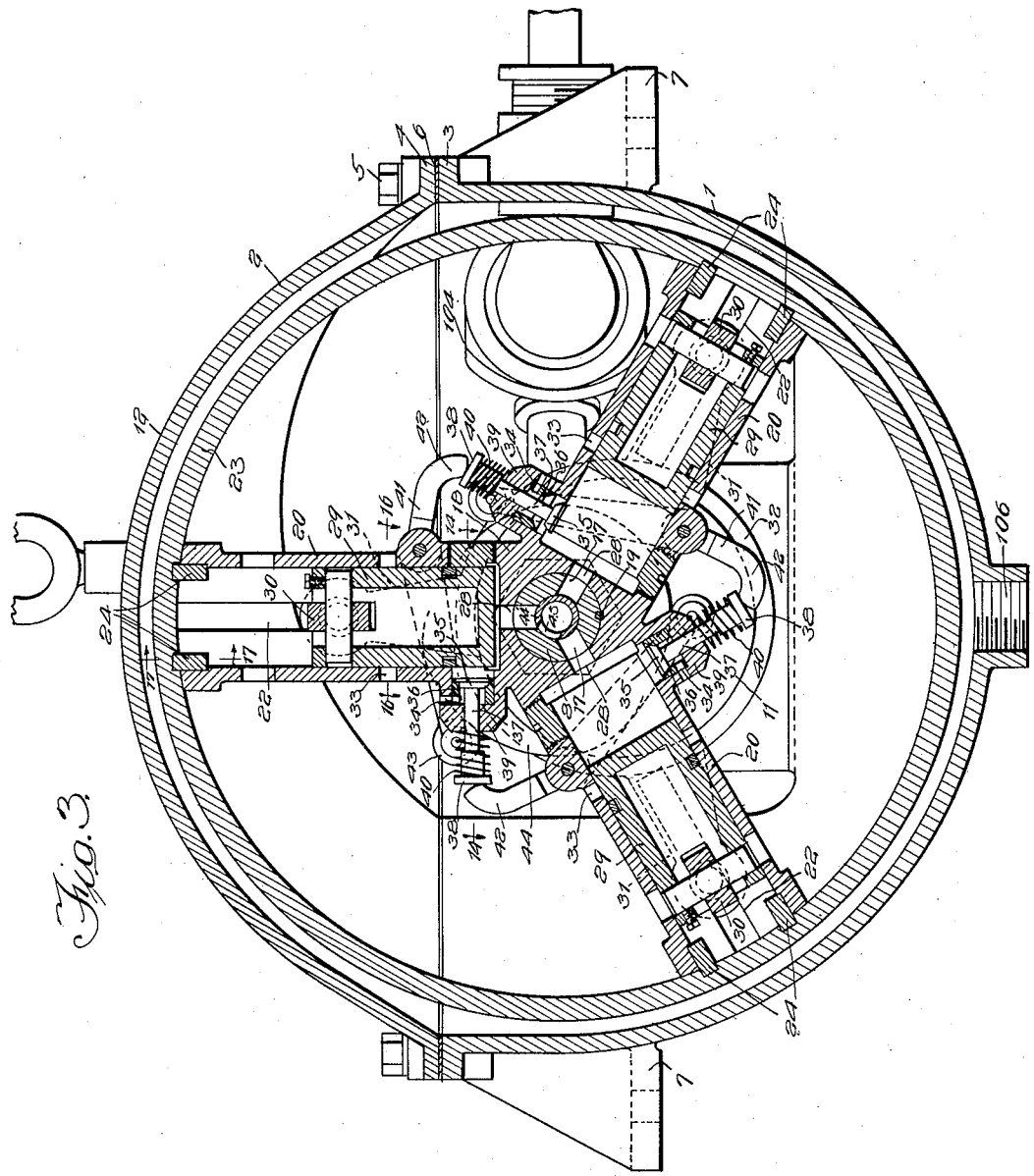
Fig. 3 is a transverse section on the line 3—3 of Fig. 1.

As illustrated in Fig. 3, the body member 18 is provided with radial ports 28 which form communication between the ports 17 and the inner ends of the cylinders 20, and movable in the cylinders are the pistons 29 to the outer ends of which are connected in any suitable manner the cross arms 30 which are movable in the slots 22 of the cylinders, and each one of the cross arms 30 has attached to opposite ends the arms 31 which are provided at their outer ends with the rings 32 rotatably mounted upon the eccentric, arms 31 having connection with the eccentrics 10 and 11 so that upon reciprocation of the pistons within the cylinders rotary movement will be imparted to the shaft 8. It will be noted that the outer ends of the cross arms 30 are reduced and substantially circular in form so as to permit the outer perforated ends of the arms 31 to turn freely thereon, and the ends of arms 31 are retained on the ends of the cross arms in any suitable manner. The cylinders 20 are provided at a point adjacent the inner ends of the slotted portions 22 with a plurality of exhaust ports 33 arranged circumferentially within the cylinders whereby when the piston reaches the limit of its outer movement these exhaust ports will be uncovered to permit exhaust of the used fluid, and in order to provide for removal of all used fluid from the cylinders before a new charge is received each one of the cylinders is provided at its inlet end, but preferably in the side wall thereof, with an exhaust port 34 normally closed by means of the valve 35 seated upon the annular valve seat 36. While I have shown and described specific means for opening and closing the ports 34, it will be understood that various ways may be used for opening and closing ports 34 other than by the valves 35 and the particular way in which the opening and closing of the valves is controlled.

In order to provide for the opening of the ports 34 at the proper time, each valve 35 is formed with a stem 37 having a headed outer end 38, and disposed between the headed end 38 and the lateral housing 39 is a coil spring 40 which tends to normally retain the valve 35 in a seated position. The valves are opened by means of the pivoted levers 41 carried by the cylinders 20 and each having one end thereof curved inwardly as at 42 for contact with the headed portion 38, while the other end of each arm supports a roller 43 rotatable upon a cam member 44, the high point of which is in such position relative to the cylinders as to provide for the opening of each exhaust port 34 at the time the piston in each cylinder is returning to the inner end of the cylinder, while the low point of the cam is in such position as to permit the coil springs 40 to move the valves 35 to a closed position during its outward or power stroke and until after the exhaust has passed through the ports 33 and the piston is again returning on its inner stroke. This improved type of exhaust causes all of the used fluid to be exhausted from the cylinders before a new charge of fluid is received in the cylinder. The pressure beneath the pistons also causes positive closing of valves 34, and these valves 34 allow drainage of any water which might accumulate in the cylinders through condensation.

The valve which controls the intake of fluid to the cylinders 20 is in the form of a cylindrical body 44' having an elongated port 45, the inner end of which has its side walls converging to form a tapered portion 46, and the body of the valve is split longitudinally and transversely as shown at 47 and 47' to permit the same to expand to a certain degree within the shaft 8. The valve 44' is split to expand for taking up wear and form fluid tight engagement with the shaft 8 at all times.

The outer end of the valve 44' extends into and is connected to a movable member 48 mounted upon a suitable bearing 49, and attached to the movable member is an arm 50 having an internally threaded sleeve 51 adjustably mounted upon a screw 52 which is rotatable by means of the hand-wheel 53 connected to the screw through the medium of the shaft 54. It will be apparent from the foregoing that the relative positions of the cylinders with respect to the intake ports 17 in the shaft 8 is such that the cylinders will at all times be off center, and in starting the motor it is preferred to have the larger portion of the opening 45 aligned with the ports 17, admitting a full charge of fluid to the cylinders in communication with the ports 17, and as soon as the motor has reached the proper velocity the valve may be adjusted inwardly in order to reduce the intake of fluid, and as the motor increases in speed the intake of fluid may be still further reduced so that when the motor is running under full speed without load a minimum amount of fluid pressure can be used to create a maximum number of revolutions of the motor and while the amount of fluid admitted to the cylinders is less, it maintains the same degree of pressure which allows a greater degree of expansion in the cylinders, thus creating considerable saving in the amount of fuel used. However, as load is applied to the shaft, it will be necessary to increase the amount of fluid admitted to the ports 17, and this adjustment may be readily carried out by grasping the hand wheel 53 and adjusting the valve member longitudinally in the shaft 8.

The means whereby the motor may be reversed includes an arm 54' formed integral with the movable member 48 and extending longitudinally of the shaft 8 and valve 44', the inner end of the arm being formed with a lateral extension 55 carrying the sleeve 56 which receives the pin 57 (Figs. 1, 8 and 10) on the cam member 44, whereby the relative position of the cam 44 may be reversed simultaneously with the rotary movement of the valve 44'. As will be noted in Figs. 2 and 10 the pin 57 which connects the sleeve 56 and cam 44 extends through the portion 14 and eccentric 11 and operates within the arcuate aligned slots 58 and 58' formed in the portion 14 and eccentric 11, respectively, to readily permit movement of the cam 44.

In order to impart movement to the arm 55 which will cause the same to oscillate in the arc of a circle relative to the valve 44', the movable member 48 is formed with a gear portion 59, and meshing with the gear portion is a rotatable gear 60 mounted upon a shaft 61 which supports a worm gear 62 meshing with a worm 63 on a substantially vertical shaft 64. The lower end of the vertical shaft 64 has a beveled gear 65 meshing with a similar gear 66 on the inner end of a horizontal shaft 67. The shaft 67 is connected with a hand wheel 68 by suitable universal connection 69 whereby rotation of the hand wheel 68 will impart rotative movement to the member 48 which, in turn, will through the connections specified, impart a substantially rotative movement to the cam 44 and the sleeve 44' due to the fact that the outer end of the sleeve 44' is connected with the member 48 in such manner as to cause the same to rotate with the said member. From this it will be apparent that whenever desired the motor may be quickly and readily reversed through rotation of the hand wheel 68, reversing the angular position of the opening 45 relative to the ports 17 and reversing the position of the cam 44 for actuating the exhaust valves 35.

In order to provide for a fluid tight joint at the inner end of the shaft 8, I provide a gland packing 70 retained in position by means of a sleeve 71, the inner end of which is mounted upon and connected with the shaft 8, as will be clearly noted in Fig. 2. This packing 70 is retained in positions by means of an adjustable sleeve 72 which is externally threaded and screwed into the end of the sleeve 71 which projects beyond the end of the shaft 8 and the packing. The sleeve 72 is provided on its outer end with an annular shoulder having a plurality of recesses 73 adapted to receive a pin 74 carried by the locking collar 75. This collar 75 is mounted upon the sleeve 71 and retained in a projected position so that the pin 74 is retained in any one of the recesses 73 by means of a coil spring 76 disposed between the collar 75 and the inner headed end of the sleeve 71. It will be apparent from this structure that in order to take up the wear of the gland packing 70 the sleeve 72 may be readily adjusted within the sleeve 71 by sliding the collar 75 on the sleeve 71 to disengage the pin 74 from one of the recesses 73, at which time the sleeve 72 may be readily adjusted as required and the pin 74 again engaged with one of the recesses 73, the tension of the spring 76 positively retaining the pin within the proper recess.

In order to insure against leakage of the fluid at the opposite end of the shaft 8, a second gland packing 77 is arranged within an annular housing 78 and adjustable in the housing 78 is a sleeve 79 formed with an annular outer end provided in its periphery with a plurality of notches 80 and adapted to be positioned in any one of these notches for retaining the sleeve 79 against rotative movement is the inner cross piece 81 on a movable frame 82, said frame having its side portions slidably mounted within suitable openings in a bracket 83 extending longitudinally from the end of the main housing and said frame being maintained in a projected position so that the cross piece 81 will be readily positioned within one of the notches 80 by means of a coil spring 84.

As illustrated in Fig. 2, suitable means is provided for properly lubricating the bearing portions 14 of the eccentrics 10 and 11 so that the shaft 8 will rotate freely therein, said means including the ducts 85 which extend inwardly through portions of the structure and have communications with lubricating cups 86.

In order to transmit power from the shaft 8, a connecting wheel 87 is mounted upon and keyed to the outer end of the shaft 8, as illustrated in Figures 1 and 2, said wheel being retained against independent movement relative to the shaft by means of set screws 88. It will be apparent from this that a belt, pulley or gear may be readily attached to the outer face of the wheel 87 in any suitable manner so that power may be readily received from the shaft 8.

In order to provide for quick stopping of the motor when so desired, I provide a brake mechanism which is to be used in connection with the wheel 87, said brake including oppositely disposed brake shoes 89 pivotally connected at one of their ends, as at 90, and provided at their inner faces with the shoe brake lining 91. The free ends of the brake shoes 89 have adjustably connected to their outer ends the oppositely directed arms 92, the outer ends of which are connected by means of the links 93 to a sliding block 94 mounted in the guide 95. This guide 95 may be mounted upon any suitable stationary part of the motor housing and in order to impart movement to the brake shoes 89 a hand operating lever 96 is pivotally mounted, as at 97, and formed at its inner end with oppositely extending lateral arms 98 and 99, the arm 98 being suitably connected at its outer end to the block 94 so as to form operative connection between the lever 96 and the ends of the brake shoes 89, whereby said brake shoes may be quickly moved toward the exterior of the wheel 87. Upon releasing the lever 96 after application of the brake shoes, it will be noted that the arm and link connections between the brake shoes and lever will be returned to their inoperative positions through the medium of a spring 100, one end of which is connected to a stationary part of the housing while the other end is connected to the outer end of the arm 99 for imparting movement to the lever 96, and in order to adjust the limit of movement of the lever 96 an adjusting screw 101 is carried by the arm 99 and adapted for engagement with the stop 102.

Figure 4:
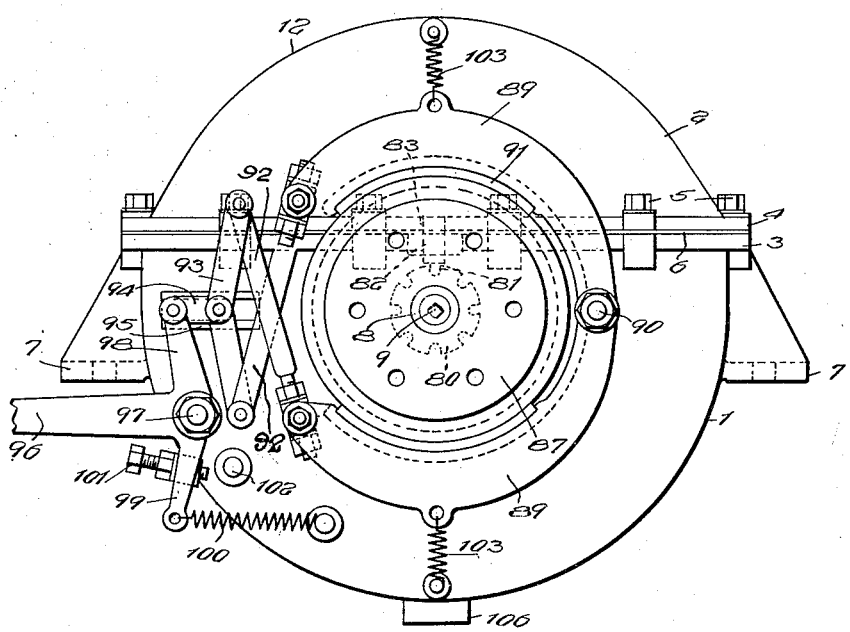
Fig. 4 is an end elevation looking toward that end from which the power is supplied.
Figure 5:
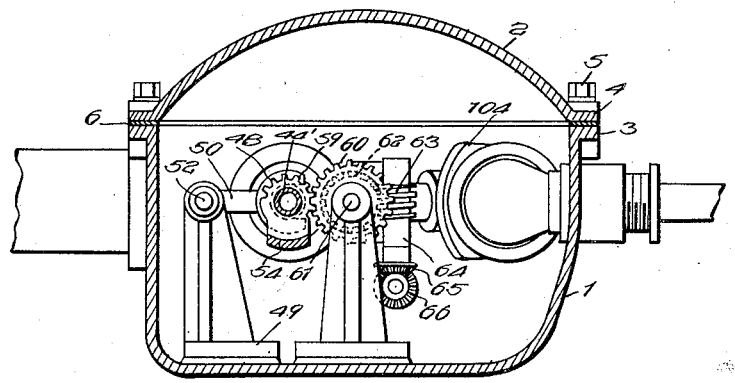
Fig. 5 is a transverse section on the line 5—5 of Fig. 1.
Figure 6:
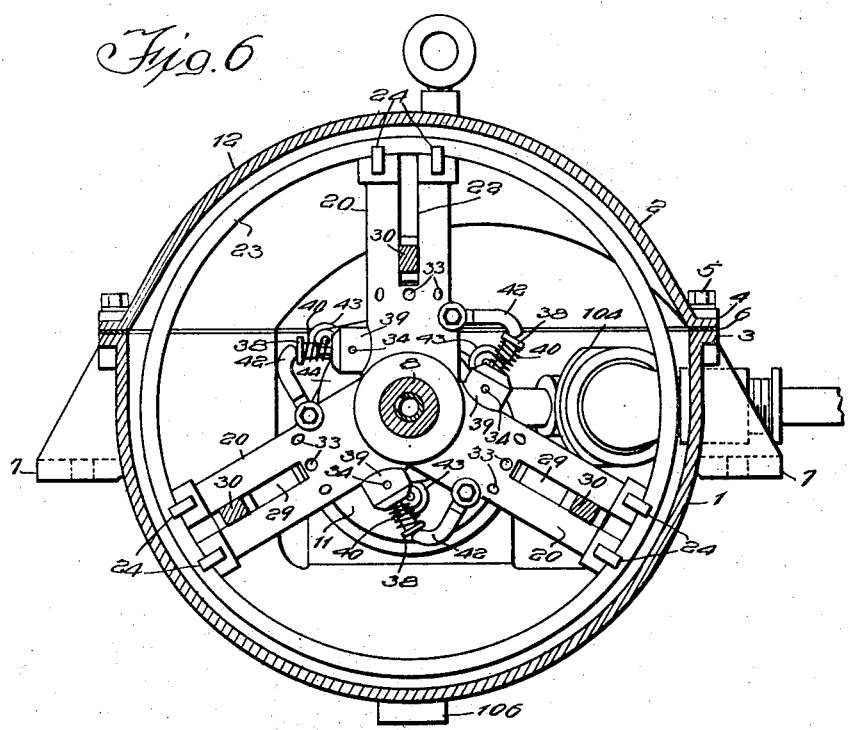
Fig. 6 is a transverse section on the line 6—6 of Fig. 1.
Figure 7:
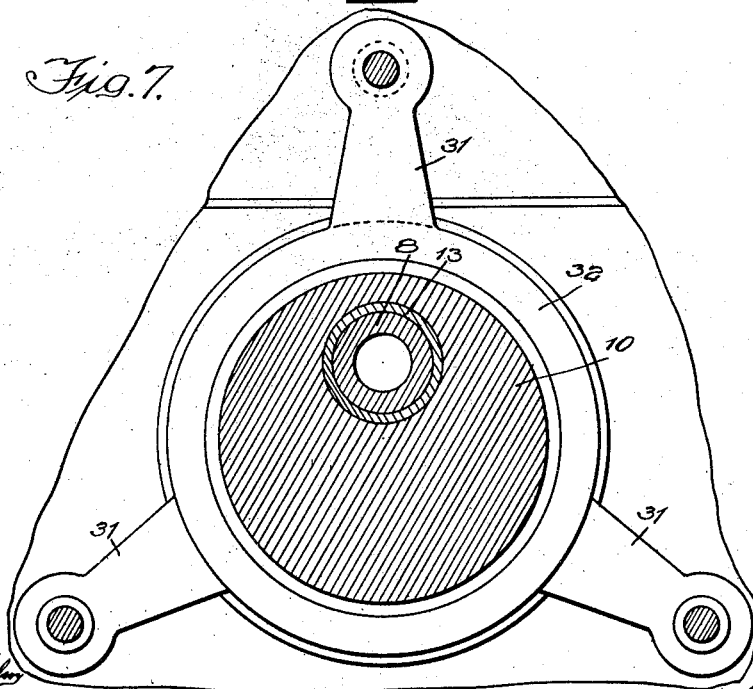
Fig. 7 is a transverse section on the line 7—7 of Fig. 2.

The brake shoes 89 will be assisted in their return to an inoperative position upon release of the connection between the shoes and lever 96 by means of the springs 103 disposed between a portion of the housing of the motor and the im ╌╌╌╌ portions of the brake shoes, as is clearly illustrated in Figure 4.

In the operation of my device as a fluid pressure motor, it will be noted that fluid is admitted to the sleeve valve 44' through the connections 104, which has connection with a source of fluid supply and upon the initial discharge of fluid from the valve 44' attention is directed to the fact that the valve is in such position as to have the largest portion of the port 45 in communication with the ports 17, so that considerable pressure will be admitted to the cylinders upon the starting of the motor. After the motor has been initially started and the momentum increased so that an appreciable amount of velocity has been obtained, the valve 44' may be readily adjusted longitudinally within the shaft 8 so as to cut down the amount of the fluid admitted to the cylinders by moving the valve further into the shaft, bringing the tapered portion 46 opposite the ports 17, thus reducing to a minimum the amount of the fluid pressure used in order to obtain proper development of power to a maximum amount, but the fluid pressure to the cylinders may be quickly increased through the longitudinal adjustment of the valve.

It will be apparent that through the eccentrical connection of the pistons the cylinders will be caused to rotate carrying the shaft 8 therewith and the exhaust of the used fluid will be readily taken care of by the outermost exhaust ports 33 and the innermost ports 34, the ports 34 being operatively opened through the operative mechanism disclosed upon the first part of the return movement of the pistons so as to properly clear the cylinders of all used fluid before admitting a new charge of fluid.

It will also be apparent from the construction that the valve 44' is in such position relative to the shaft and the cylinders carried thereby as to admit fluid pressure to the cylinders at a slight angle from dead center and in order to reverse the position of the valve so as to change the angle of admission and cause the cylinders to be driven in opposite directions, the rotatable member 48 can be readily adjusted by the hand wheel 68. At the same time the sleeve valve 44' is adjusted the relative position of the cam 44 is likewise changed so as to open and close the inner exhaust ports at the proper time.

As stated heretofore, the device may be used equally as well as a compressor by attaching a pulley, gear or the like to the wheel 87, removing the cam 44 and eliminating the outer exhaust ports 33. In using the device as a compressor, it will be noted that the inner exhaust ports 34 will be opened through the suction of the outer stroke of the piston and will be closed upon the inward stroke of the piston so that the air compressed beneath the piston will be discharged through the ports 17 into the shaft 8 as the parts of each cylinder successively communicate with the elongated port 45 of the valve 44'.

Attention is directed to the fact that the used fluid exhausted through the ports 33 and 34 is passed from the interior of the housing through the port 106 in the lower or main section 1.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a fluid pressure motor, a hollow shaft, an assemblage of cylinders upon the shaft and having ports communicating therewith, pistons in the cylinders, said cylinders having exhaust ports adjacent the outer and inner ends, spring pressed valves normally closing the innermost ports, power transmitting means having connection with the pistons and eccentrically mounted relative the axis of the shaft to effect rotation of the shaft upon the admission of fluid pressure to said cylinders successively in the rotation of said shaft, means whereby to open and close said outer and inner ports successively for clearing the cylinders before receiving a new charge of fluid, a sleeve valve controlling the admission of fluid to said cylinders, and means for simultaneously adjusting said sleeve valve and said port controlling means whereby to reverse said motor.

2. A device of the class described including a rotatably mounted hollow shaft, an expansible tubular valve rotatably and slidably mounted in the shaft and projecting from one end, a packing gland at one end of the shaft and surrounding the valve, a sleeve carried by the shaft and projecting at one end beyond the gland, a second sleeve threaded into the outer end of the first sleeve and engaging the gland, and spring pressed locking means carried by the first sleeve and having detachable connection with the second sleeve.

3. In a fluid pressure motor, a hollow shaft, an assemblage of cylinders on the shaft, pistons in the cylinders, an expansible sleeve valve mounted for rotating and sliding movement in the shaft, said valve being slit transversely and longitudinally and formed with an elongated port whereby to provide for expansion of the valve for close fitting contact with the inner wall of the shaft, and means for effecting rotation of the shaft upon admittance of fluid pressure to said cylinders successively in the rotation of the shaft.

4. In a fluid pressure motor, a hollow shaft, an assemblage of cylinders upon the shaft having ports communicating with the interior of the shaft, pistons in the cylinders, said cylinders having inner and outer exhaust ports, said outer exhaust ports comprising port-holes opened and closed by the movement of said pistons, valves for opening and closing said inner exhaust ports, pivoted arms on said cylinders, a cam, said pivoted arms engaging said cam for opening and closing said valves, an expansible sleeve valve rotatably and slidably mounted in said shaft for controlling the admission of fluid to the cylinders, power transmitting means having connection with the pistons and eccentrically mounted relative to the axis of the shaft to effect rotation of the shaft upon the admission of fluid to said cylinders successively on the rotation of said shaft, adjustable means for simultaneously and cooperatively rotating said sleeve valve and said cam whereby the direction of rotation of said shaft may be reversed, and means independent of said last-mentioned means for sliding said sleeve valve for controlling the amount of fluid admitted to said cylinders.

5. In a device of the class described including a rotatably mounted hollow shaft, an expansible tubular valve rotatably and slidably mounted in the shaft and projecting from one end thereof, a packing gland at one end of the shaft and surrounding the valve, a sleeve carried by the shaft and projecting at one end beyond the gland, a second sleeve threaded into the outer end of the first sleeve and engaging the gland, an annular flange on said second sleeve, a spring pressed collar on said first sleeve and means on said spring pressed collar for engaging said annular flange.

6. In a fluid pressure motor, a hollow shaft, an assemblage of cylinders upon the shaft and having ports communicating therewith, pistons in the cylinders, said cylinders having exhaust ports adjacent the outer and inner ends, spring pressed valves normally closing the innermost ports, power transmitting means having connection with the pistons and eccentrically mounted relative the axis of the shaft to effect rotation of the shaft upon the admission of fluid pressure to said cylinders successively in the rotation of said shaft, valve means for opening and closing the exhaust ports at one end of said cylinders, a sleeve valve controlling the admission of fluid to said cylinders, and means for simultaneously adjusting said sleeve valve and said valves for controlling the exhaust ports in order to reverse said engine.

7. In a fluid pressure motor, a hollow shaft, an assemblage of cylinders upon the shaft and having ports communicating therewith, pistons in the cylinders, said cylinders having exhaust ports adjacent the outer and inner ends, spring pressed valves normally closing the innermost ports, power transmitting means having connection with the pistons and eccentrically mounted relative the axis of the shaft to effect rotation of the shaft upon the admission of fluid pressure to said cylinders successively in the rotation of said shaft, valve means for opening and closing the exhaust ports at one end of said cylinders, a sleeve valve having a tapered longitudinal port for controlling the admission of fluid to said cylinders, and means for simultaneously rotating said sleeve valve and for adjusting said valves for controlling said exhaust ports in order to reverse said engine.

In testimony whereof, I have hereunto signed my name.

PAUL H. BENEDIX.